Figure 1:
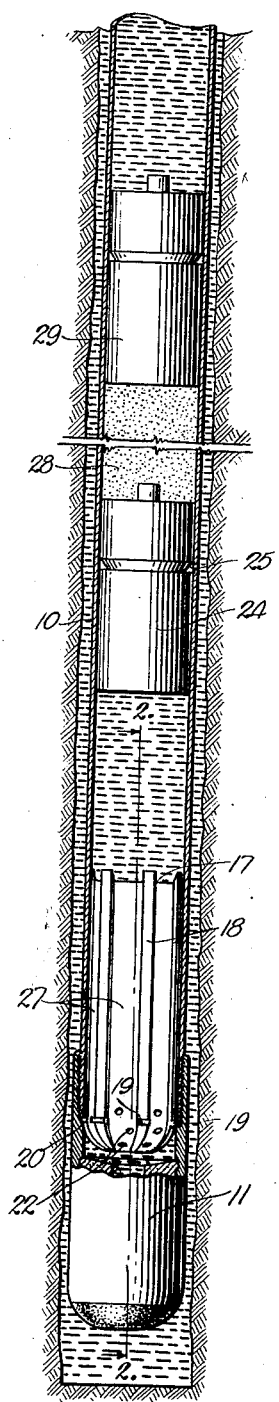

July 17, 1951   J. E. HALL   2,560,692
WELL CEMENTING APPARATUS
Filed May 24, 1947

INVENTOR.
Jesse E. Hall
BY Thos. E. Acfield
ATTORNEYS.

Patented July 17, 1951

2,560,692

UNITED STATES PATENT OFFICE 2,560,692

WELL CEMENTING APPARATUS

Jesse E. Hall, Weatherford, Tex., assignor of ninety per cent to Nevada Leasehold Corporation, Las Vegas, Nev., a corporation of Nevada, and ten per cent to Parker Industrial Products, Inc., Weatherford, Tex., a corporation of Texas Application May 24, 1947, Serial No. 750,205

4 Claims. (Cl. 166—1)

The present invention relates in general to an improved method and apparatus for cementing oil wells or the like and it deals more particularly with the construction and use of a device for halting traveling plugs.

After an oil or gas well has been drilled to the desired depth it often is advantageous to fill the annular space between the casing and the well bore with cement to a certain height above the bottom of the well in order to prevent the influx of water and gas and to isolate the producing strata. This customarily is accomplished by introducing a charge of cement into the upper end of the casing preceded by a charge of well fluid or mud and followed by another charge of well fluid or mud. With suitable pumping apparatus these charges are caused to move downwardly through the casing to the bottom of the hole and then upwardly in the annular space around the casing. Immediately behind the cement charge a piston-like traveling plug is inserted into the casing to separate it from the following mud charge and when this plug reaches the bottom of the casing it is halted by a suitable obstruction such as a shoulder or casing shoe. At this point in the process the cement charge ahead of the plug will have been forced out of the bottom of the casing into the annular space around the outside of the casing, it being understood that the quantity of cement supplied is such that the cement lining will extend up to the desired height in the well bore.

In many cases in the past plugs have been employed in this fashion only at the trailing end of the cement charge, none being used at the leading end for the reason that a leading end plug upon reaching the obstruction at the bottom of the casing would block the outlet and prevent egress of the cement from the casing. The lack of a leading end plug naturally results in contamination of the cement due to the fact that the well fluid advancing before the cement charge leaves a coating or film of mud on the interior of the casing that scrapes off and mixes with the cement. The leading portion of the cement charge (which upon completion of the cementing operation forms the upper portion of the annular column surrounding the casing) thus is of inferior quality.

In some cases attempts have been made to use a leading end plug in conjunction with ports situated in the wall of the casing near the bottom, which ports normally are closed but are mechanically opened by the plug as it passes them whereby the cement thereafter may flow into the well bore through the open ports. These arrangements are complicated, comparatively expensive and subject to mechanical failure which makes them somewhat unreliable. Also when once open the ports ordinarily have relatively ineffectual means for checking a reverse flow of the fluid therethrough.

It is an object of the present invention to provide a simple, reliable and inexpensive means for halting a plug when it arrives at a predetermined point in its travel through the casing and causing the material behind the plug thereafter to bypass same. A more specific objective is to provide an arrangement whereby the material behind the plug after bypassing the plug proceeds through a check valve that previously handled the material ahead of the plug.

Another object is to provide an improved method and means for preventing or at least greatly minimizing contamination of the leading end of a cement charge used for cementing a well.

Another object is to provide an improved strainer for removing foreign matter from the charges employed in cementing wells. Other and further objects will appear in the course of the following description of the invention.

Figure 2:
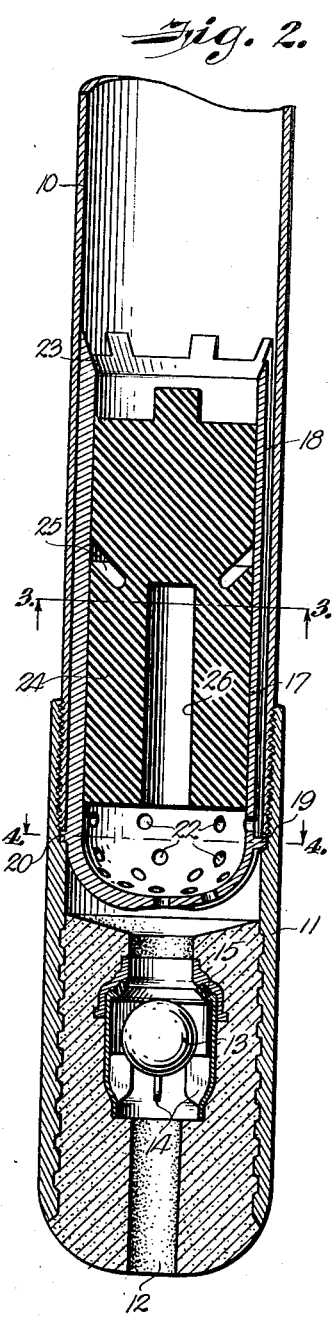
Figure 3:
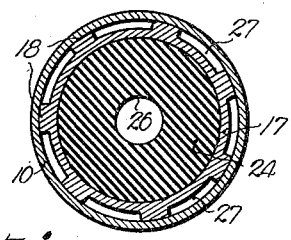
Figure 4:
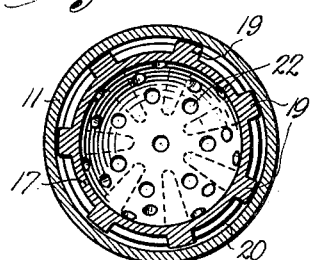
Figure 5:
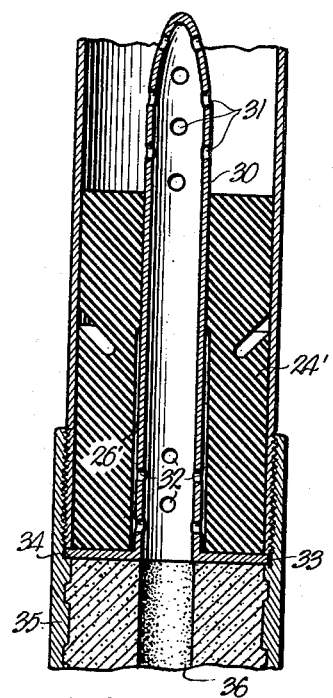

In the accompanying drawings which form a part of the specification and are to be read in conjunction therewith, and in which like reference numerals are employed to identify like parts of the various views, Fig. 1 is a view of the lower end of a string of casing disposed in a well bore, part of the casing wall having been cut away to show, in elevation, a pair of plugs traveling downwardly therein and also my device for receiving the foremost plug, Fig. 2 is an enlarged cross sectional view taken along the line 2—2 of Fig. 1 in the direction of the arrows, Fig. 3 is a cross sectional view taken along the line 3—3 of Fig. 2 in the direction of the arrows, Fig. 4 is a cross sectional view taken along the line 4—4 of Fig. 2 in the direction of the arrows, and Fig. 5 is an axial cross section of a modified form of device for receiving the plug.

Referring to the drawings and particularly to Figs. 1 to 4, inclusive, it will be seen that the well casing 10 is threaded at its lower end to receive the shoe 11. The shoe may be of conventional construction having, as indicated, an axial duct 12 wherein is disposed a check valve comprising a ball 13 normally resting on fins 14, together with an overhead annular seat 15 against which the ball is adapted to be raised by an upward flow of fluid in order to check that flow.

Fixedly positioned in the casing 10 above the shoe is an elongated basket 17 formed of plastic, aluminum or other easily drillable material. Its outer wall is fluted to form longitudinal ribs 18 which engage the interior of the casing and maintain the main body of the basket spaced therefrom. The unit is firmly anchored against longitudinal movement by a plurality of radially extending flanges 19 which are clamped between the end of the casing and a shoulder 20 in the shoe, this being done of course when the shoe is originally screwed onto the lower end of the casing before the string is lowered into the well bore. It will be observed that the curved bottom of the basket contains perforations 22 and that the upper end has an internal bevel or taper as shown at 23.

The basket is adapted to receive a traveling plug 24 formed of rubber or like resilient deformable material. The plug is shown as having an annular groove 25 and a central cavity 26 but these are not essential. In unrestrained condition its outside diameter is slightly greater than the inside diameter of the casing so that when the plug is introduced into the casing its bears against the walls with a tight piston-like fit. In use it is inserted into the casing immediately ahead of the cement 28 so that as it advances the mud is scraped from the inner surface of the casing and pushed ahead of the plug in such a manner as to prevent the cement from being contaminated thereby. The advancing mud flows through apertures 22 in the basket or past the outside of the basket through passageways 27 thence through the check valve and duct 12 into the bottom of the well where its course is reversed and it moves upwardly around the outside of the casing.

When the plug reaches the basket it is forced thereinto (see Fig. 2) by the pressure acting on its upper end. Its entry is accomplished by a radial compression of the plug which reduces its cross sectional area, this being facilitated by the internal taper at the top of the basket. Thus positioned the plug prevents the cement from passing through apertures 22 but it leaves it free to flow through the vertical passageways 27 outside of the basket whereby the cement advances past the plug through the check valve and duct 12 into the well and goes upwardly around the outside of the casing. The passageways have a combined cross sectional area greater than the throat of the valve and accordingly do not impede the cement flow any more than the valve alone would do.

Trailing the cement charge is another plug 29 which may be assumed to be similar to plug 24. This will not fully enter the basket when it reaches same inasmuch as plug 24 already occupies most of the space therein and accordingly the trailing plug will prevent the charge of mud following the cement from passing out of the casing into the well. After the cement has set the plugs, the basket and the shoe may be removed by drilling in the conventional way.

An alternative arrangement for achieving fundamentally the same result is shown in Fig. 5. This comprises a hollow stem 30 tapered to a blunt point at its upper end and having apertures 31 and 32 at its top and bottom respectively. Like the basket described hereinbefore the stem is made of easily drillable material and is anchored to the casing by an annular flange 33 clamped between the lower end of the casing and a shoulder 34 on the shoe 35.

A travelling plug 24' similar in form to the one shown in Figs. 1 and 2 is inserted into the casing ahead of the cement charge and when this reaches the bottom of the casing the cavity 26' in the plug advances over the hollow stem 30 and then with the continued advance of the plug due to the pressure on its upper end the stem pierces its upper portion so that the plug becomes impaled upon the stem as illustrated. This allows the perforated tip of the stem to extend above the plug whereby the cement behind same now may flow through the apertures 31 and the interior of the stem to duct 36 leading to the check valve in the shoe. The total opening afforded by apertures 31, i. e., their combined cross sectional area, should be at least as great as the area of the throat of the check valve at its smallest point.

Assuming a plug like the one shown is employed behind the cement charge, it will be seen that this will not be pierced by the stem and hence it will prevent the mud traveling behind the cement from passing out of the casing into the well. After the cement has set the plugs, the stem assembly and the shoe may be removed by drilling as conventional.

While the devices described above are designed primarily to halt a plug preceding the cement charge and allow the charge thereafter to advance past the plug attention is directed to the fact that they also serve to prevent foreign objects from reaching and clogging the valve in the shoe. A workman's gloves dropped into the well fluid, for example, will be caught by the basket 18 or the stem assembly of Fig. 5 without interrupting the flow of fluid toward the valve.

From the foregoing it will be seen that this invention is one well adapted to attain all of the ends and objects hereinbefore set forth together with other advantages which are obvious and which are inherent to the apparatus.

Inasmuch as many possible embodiments of the invention may be made without departing from the scope thereof, it is to be understood that all matter herein set forth or shown in the accompanying drawings is to be interpreted as illustrative and not in a limiting sense. For example, although the basket and stem assembly are shown as being positioned immediately above the casing shoe, it is obvious that they could be positioned at a higher point in the casing; if a float collar were used in the casing string they would be situated above the collar.

It will also be understood that certain features and subcombinations are of utility and may be employed without reference to other features and subcombinations. This is contemplated by and is within the scope of the claims.

Having thus described my invention, I claim:

1. In combination with a resilient piston-like plug adapted to travel downwardly through a well casing behind a charge of mud and in advance of a charge of cement thereby to separate the two, a vertically elongated rigid basket fixedly positioned within the lower end of the casing and adapted to receive said plug, the bottom of said basket containing a plurality of perforations through which the mud ahead of the plug can pass downwardly, and integral vertical fluting on the exterior side wall of the basket engaging the inside wall of the well casing and providing with the latter wall flow passageways through which the cement can pass downwardly when the plug is in said basket.

2. In combination with a resilient piston-like plug adapted to travel downwardly through a well casing behind a charge of mud and in advance of a charge of cement thereby to separate the two, a vertically elongated rigid basket insertable into the lower end of the casing to receive said plug, integral flange means on said basket projecting radially outward and adapted to abut against the lower end of the well casing, a collar screw threadedly secured to the lower end of the casing and having a shoulder under said flange means whereby said basket is secured against axial movement in the casing, the bottom of the basket containing a plurality of perforations through which the mud ahead of said plug can pass downwardly, and integral vertical fluting on the exterior side wall of the basket engaging the inside wall of the well casing and providing with the latter wall flow passageways through which the cement can pass downwardly when the plug is in said basket.

3. In combination with a resilient piston-like plug adapted to travel downwardly through a well casing behind a charge of mud and in advance of a charge of cement thereby to separate the two, a vertically elongated sleeve fixedly secured within the well casing at its lower end, the outside diameter of said sleeve being smaller than the inside diameter of the casing, integral vertical ribs on the exterior of said sleeve engaging the interior of the well casing to maintain the sleeve centrally located therein and provide vertical flow passageways between the exterior of the sleeve and the interior of the casing, the upper ends of said ribs projecting above the upper end of the sleeve and terminating at their top in a knife-edge disposed flush against the inside wall of the casing, and the inner faces of the projecting portions of said ribs sloping inwardly and downwardly from said knife-edge thereby to facilitate entry of said resilient plug into said sleeve when it reaches same.

4. In combination with a resilient piston-like plug adapted to travel downwardly through a well casing behind a charge of mud and in advance of a charge of cement thereby to separate the two, a vertically elongated sleeve insertable within the lower end of the casing, the outside diameter of said sleeve being smaller than the inside diameter of the casing, integral vertical ribs on the exterior of said sleeve engaging the interior of the casing to maintain the sleeve centrally located therein and provide vertical flow passageways between the exterior of the sleeve and the interior of the casing, integral flanges projecting radially outward from said ribs and abutting the lower end of the well casing, a collar screw-threadedly secured to the lower end of the casing and having a shoulder under said flanges whereby said sleeve is secured against axial movement of the casing, the upper end of the bore of said sleeve flaring upwardly and outwardly to facilitate entry of said resilient plug into the sleeve.

JESSE E. HALL.

REFERENCES CITED

The following references are of record in the file of this patent:

UNITED STATES PATENTS

| Number | Name | Date |
| --- | --- | --- |
| 1,790,450 | Torrance | Jan. 27, 1931 |
| 2,071,389 | Crowell | Feb. 23, 1937 |
| 2,075,882 | Brantly | Apr. 6, 1937 |
| 2,310,483 | Wickersham | Feb. 9, 1943 |